United States Patent
Varatharajan et al.

(10) Patent No.: US 7,595,124 B2
(45) Date of Patent: Sep. 29, 2009

(54) INTEGRATED FUEL CELL HYBRID POWER PLANT WITH CONTROLLED OXIDANT FLOW FOR COMBUSTION OF SPENT FUEL

(75) Inventors: Balachandar Varatharajan, Clifton Park, NY (US); Chellappa Balan, Niskayuna, NY (US); Debashis Dey, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 1223 days.

(21) Appl. No.: 10/681,704

(22) Filed: Oct. 9, 2003

(65) Prior Publication Data

US 2005/0079395 A1    Apr. 14, 2005

(51) Int. Cl.
H01M 8/04 (2006.01)
(52) U.S. Cl. .............. 429/26; 429/22; 429/30
(58) Field of Classification Search .......... 429/26, 429/24, 22, 17, 34, 30
See application file for complete search history.

(56) References Cited

U.S. PATENT DOCUMENTS

| 5,413,879 | A | * | 5/1995 | Domeracki et al. | 429/30 |
| 5,441,821 | A |   | 8/1995 | Merritt et al. |   |
| 6,213,234 | B1 | * | 4/2001 | Rosen et al. | 180/65.3 |

* cited by examiner

*Primary Examiner*—Raymond Alejandro
(74) *Attorney, Agent, or Firm*—Patrick K. Patnode

(57) ABSTRACT

A hybrid power generation system for generating electrical power comprises a compressor for producing a compressed oxidant and a recuperator in flow communication with the compressor. The hybrid power generation system further comprises a fuel cell assembly comprising a plurality of fuel cells in flow communication with the recuperator to provide the compressed oxidant for the fuel cell assembly. The hybrid power generation system further comprises a tail gas burner in flow communication with the fuel cell assembly. A control system is used for controlling the amount of cathode exhaust stream introduced in the tail gas burner for stable combustion and reduction of fuel and carbon monoxide emission. The hot compressed gas from the tail gas burner is introduced to a turbine, where the hot compressed gas is expanded, thereby producing electrical power and an expanded gas.

18 Claims, 5 Drawing Sheets

INTEGRATED FUEL CELL HYBRID POWER PLANT WITH CONTROLLED OXIDANT FLOW FOR COMBUSTION OF SPENT FUEL

BACKGROUND OF INVENTION

This invention relates generally to power plants, and, more specifically to hybrid power plants with integrated fuel cells, where the controlled injection of exhaust air from the fuel cell is used to burn the spent fuel from the fuel cells.

In certain hybrid power generation systems, fuel cells have been integrated with conventional gas turbines for increased power generation capacity in electrical power plants. Known fuel cells, such as, for example, solid oxide fuel cells include a plurality of solid oxide fuel cells that react a gaseous fuel, such as reformed natural gas, with air to produce electrical power and a hot gas. The gas turbine compressor supplies the air for the fuel cells, which fuel cells operate at elevated pressure and produce hot gas for expansion in the turbine. Fuel cell exhaust air is combined with fuel cell exhaust fuel and the resulting heat release is converted to work in the turbine portion of the plant. Thus, electrical power is produced by both the solid oxide fuel cell generator and the turbine.

Solid-oxide fuel cells usually do not convert all of the fuel that is fed into the inlet of the fuel cells. Composition of the outlet stream from the fuel cells primarily includes carbon monoxide (CO), carbon dioxide ($CO_2$), hydrogen ($H_2$), and water ($H_2O$) along with the equilibrium species and inert species like N2. In the absence of means to burn the partly spent fuel, the heat content of these constituents is wasted, thereby reducing thermodynamic efficiency of the plant. Additionally, unburned hydrocarbons and carbon monoxide may also be undesirably emitted into the atmosphere when all the fuel components for the fuel cells are not completely converted.

Accordingly there is a need to develop a combustor or a burner that can efficiently convert the fuel components in the spent fuel stream from the fuel into useful work using the fuel cell exhaust air.

BRIEF DESCRIPTION

In one aspect, a hybrid power generation system for generating electrical power comprises a compressor for producing a compressed oxidant and a recuperator in flow communication with the compressor. The hybrid power generation system further comprises a fuel cell assembly comprising a plurality of fuel cells in flow communication with the recuperator to provide the compressed oxidant for the fuel cell assembly. The fuel cell assembly further comprises a cathode inlet for receiving the compressed oxidant, an anode inlet for receiving a fuel stream, an anode outlet in flow communication with an anode exhaust stream and a cathode outlet in flow communication with a cathode exhaust stream, wherein at least a portion of the fuel reacts with the oxidant to produce electrical power. The hybrid power generation system further comprises a tail gas burner in flow communication with the anode outlet and the cathode outlet. The tail gas burner is configured for combusting a mixture of at least a portion of the anode exhaust stream and at least a portion of the cathode exhaust stream and producing a hot compressed gas. A control system is used for controlling the amount of the cathode exhaust stream introduced in the tail gas burner for stable combustion and reduction of fuel and carbon monoxide emissions. The hot compressed gas from the tail gas burner is introduced to a turbine, where the hot compressed gas is expanded, thereby producing electrical power and an expanded gas.

In yet another aspect, a method of operating a hybrid power generation system is provided. The method comprises an initial step of supplying an oxidant flow and a fuel flow to the inlet of a fuel cell assembly comprising a plurality of fuel cells. The next step is reacting electrochemically the fuel with the oxidant to produce electricity, an oxygen depleted exhaust stream and a low heat content fuel stream. The low heat content fuel stream is introduced into a tail gas burner. The flow of the oxygen depleted oxidant flow into the tail gas burner is controlled to promote stable combustion and to produce a hot gas. The hot gas is introduced in a turbine to generate electricity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
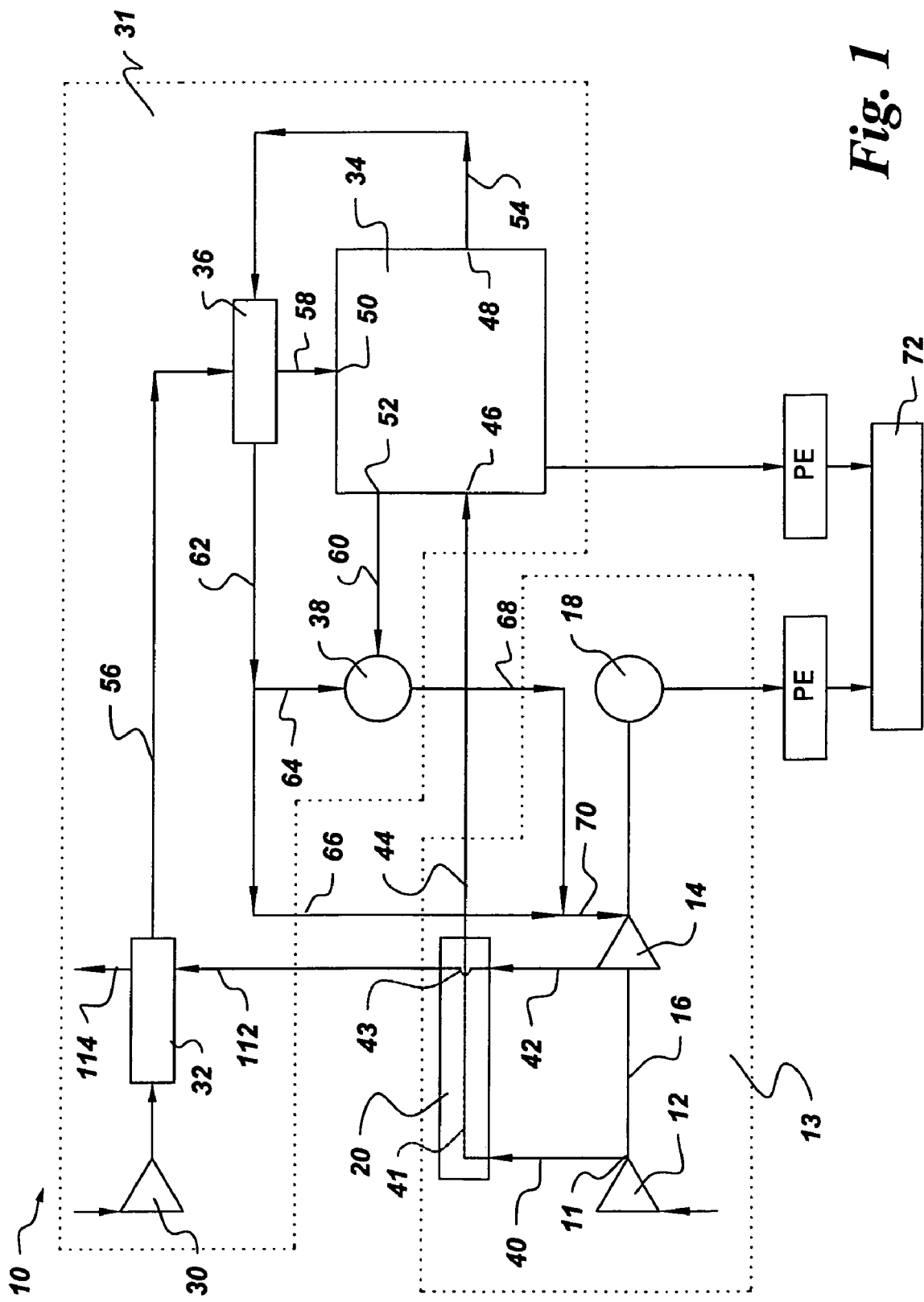
FIG. 1 is a schematic diagram of an exemplary integrated fuel cell hybrid power plant.

FIG. 1 schematically illustrates an exemplary integrated gas turbine and fuel cell hybrid power plant 10 including a fuel cell portion 31 and a turbine portion 13 for producing electricity in tandem with one another. The turbine portion 13 typically includes a compressor 12, a turbine 14, a rotor 16 by which turbine 14 drives compressor 12, an electrical generator 18, and a recuperator 20. The fuel cell portion 31 typically includes a fuel pump 30, a de-sulfurizer 32, a fuel cell assembly 34, a fuel reformer 36 for fuel cell assembly 34 and a tail gas burner 38 (hereinafter TGB). As explained in some detail below, while the basic components of plant 10 are well known, efficiency improvements in relation to known plants are obtained through strategic interconnection of plant components with re-circulation flow paths to enhance performance and efficiency of the system. The efficiency of the hybrid power plant is enhanced by converting the fuel components from the spent fuel stream from the fuel cells into useful work. As will be seen below, plant efficiency is also improved by recycling oxidant and fuel streams exhausted from the fuel cell portion 11 to extract useful work from oxidant and fuel streams in the fuel cell and turbine portions of the system, and utilizing heat generated in the turbine portion for the benefit of the fuel cell portion. In the various embodiments of the hybrid power generation systems described herein, the oxidant is ambient air. It is understood that any other oxidant stream comprising the required amount of oxygen for the reaction in the fuel cell may be used for the same purpose.

In operation, an exemplary compressor 12 is a multi-stage compressor that includes rows of stationary vanes and rotating blades. Compressor 12 inducts air and produces a compressed air stream 40 at an outlet 11 of compressor 12. The compressed air stream 40 is directed towards recuperator 20, which recuperator 20 is a known type of heat exchanger including isolated flow paths. Compressed air stream 40 enters recuperator 20 in a first recuperator flow path 41, and a turbine exhaust stream 42 is passed into recuperator 20 in a second recuperator flow path 43, whereby heat from the turbine exhaust 42 is transferred to the compressed air stream 40 from the compressor outlet 11 without mixing of the compressed air stream 40 and the turbine exhaust stream 42. Compressed air stream 40 is heated within recuperator 20 by the turbine exhaust stream 42, and a heated compressed air stream 44 exits recuperator 20 and flows to a cathode inlet 46 of fuel cell assembly 34 to provide an oxidant thereto. By heating the compressed air stream 40 with turbine exhaust 42, the costs of conventional heaters or regenerative heat exchangers to raise a temperature of the fuel cell oxidant are avoided, and turbine exhaust stream 42 is cooled before being discharged into the atmosphere. In some embodiments, the exit stream 112 from the recuperator 20 is further cooled in a desulferizer 32.

Fuel cell assembly 34 comprises a plurality of the fuel cells (not shown). Fuel cells are energy conversion devices that produce electricity by electrochemically combining a fuel and an oxidant, such as air across an ion conduction layer. More particularly, each fuel cell includes an anode, an electrolyte, and a cathode (not shown) arranged for example in a tubular or planer configuration. In a hydrogen fuel cell, hydrogen is used as fuel and the hydrogen and oxygen from an oxidant stream react to produce water and electricity. It is understood that although in various embodiments disclosed herein, the arrangement of a plurality of fuel cell is called a fuel cell assembly. It may alternatively be called a fuel cell bundle, in the case of the tubular arrangement of the fuel cells. The term fuel cell assembly, as used herein may refer to either a fuel cell stack or a fuel cell bundle. In an exemplary embodiment, fuel cell assembly 34 comprises a plurality of solid oxide fuel cell (SOFC) units with an oxygen-ion conducting solid electrolyte, such as yttria stabilized zirconia (YSZ), ceria-doped zirconia, or lanthanum strontium gallium manganate. In alternative embodiments, fuel cell assembly 34 may include, for example, proton exchange membrane (PEM) electrolytes, molten carbonate electrolytes or other known electrolyte materials suitable for use. In the various embodiments of the hybrid power generation system described herein, the fuel cell is selected from the group consisting of solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

Air inlet 46 and air outlet 48 of the fuel cell assembly 34 are referred to herein as a cathode inlet and a cathode outlet, respectively, as they provide oxidant airflow for the cathodes of fuel cell assembly 34. Similarly inlet for fuel and outlet for fuel are referred to herein as an anode inlet 50 and an anode exhaust 52, respectively, as they provide fuel flow for the anodes of fuel cell assembly 34.

The heated compressed air stream 44 from the recuperator 20 enters the fuel cell assembly 34 through cathode inlet 46 and flows through the fuel cell units in the fuel cell assembly 34. At least a portion of the fuel reacts electrochemically with the oxidant air flowing through the fuel cell assembly to produce electricity. Spent air 54 is exhausted from fuel assembly 34 through cathode outlet 48 and is designated as cathode exhaust stream 54.

The cathode exhaust stream 54 flows to a reformer 36, in which reformer gaseous hydrocarbons, for example, natural gas may be reformed in the presence of steam and a nickel catalyst into hydrogen and carbon monoxide. In different embodiments, fuel reformation may be accomplished in an external fuel reformer 36 or in a reformer integral with fuel cell assembly 34.

Gaseous fuel, which in different embodiments may be, for example, natural gas, methane, propane, n-heptane, diesel, kerosene, gasoline, or a coal derived fuel gas, is driven by fuel pump 30 through a de-sulferizer 32, which de-sulferizer in an exemplary embodiment includes a vessel containing a bed of sulfur sorbent through which fuel flows. In some embodiments, the fuel is an aviation fuel comprising fillers. Heat from the turbine exhaust 42 is transferred to the de-sulferizer 32 to warm fuel therein before being exhausted from the plant 10. Complexity and expense of an external heater for the de-sulferizer 32 is therefore avoided, and the turbine exhaust is cooled before being discharged from the plant.

De-sulferized fuel 56 flows from the de-sulferizer 32 to the reformer 36 so that fuel may be reformed in the reformer 36 prior to entering the fuel cells of fuel cell assembly 34. In another embodiment, steam (not shown) is introduced into the incoming fuel stream 56 to facilitate the reforming process. Once treated therein, the reformed fuel 58 flows from the reformer 36 to anode inlet 50 and into the fuel cells of assembly 34. Once expanded in the fuel cells, spent fuel 60 (also designated as anode exhaust stream) is exhausted from fuel cell assembly 34 through anode exhaust 52. The fuel cells usually do not convert all the fuel that is fed into the inlet of the fuel cells. Typically the anode exhaust stream 60 comprises carbon monoxide (CO), carbon dioxide ($CO_2$), hydrogen ($H_2$), unutilized fuel and water. At least a portion of the anode exhaust stream 60 is fed to a tail gas burner 38 for combustion therein. A portion of the spent (i.e., oxygen depleted) air 62 from fuel cell assembly 34 is also fed into the tail gas burner 38, and a mixture of spent air 64 and spent fuel 60 is combusted in tail gas burner 38. Combustion exhaust 68 from the TGB 38 is fed to the working fluid paths in the gas turbine 14 to provide added heat and pressure for expansion of gas in the turbine 14.

By controlling the injection of spent air 62 and exhausted fuel 60 in tail gas burner 38, it can be ensured that the fuel/air mixture is lean and within flammability limits. Thus, all of the fuel components remaining in the spent fuel stream 60 are combusted in the tail gas burner 38, thereby fully utilizing the fuel in the system and preventing discharge of unburnt fuel and carbon monoxide in exhaust 114 from the plant 10.

In operation, the anode exhaust steam 60 from the fuel cell assembly 34 is a low heat content stream as most of the reformed fuel components fed into the anode inlet 50 are utilized in the electrochemical reaction in the fuel cell assembly 34. The main feature while burning low heat content fuel is to control the injection of air into the TGB 38 so that the mixture of the fuel and oxygen depleted air is within the flammability limit. The heat content of the anode exhaust stream 60, which is fed into the TGB 38 is equal to or less than 250 British Thermal unit (herein after BTU) per cubic feet of the gas stream at standard conditions. The standard conditions herein are defined as a condition where the temperature is at 0 Deg C. and the pressure is at 1 atmosphere. In one embodiment, the heat content of the anode exhaust stream fed into the TGB 38 is less than or equal to 100 BTU per cubic feet of the gas stream at standard conditions. Since a portion of the spent air stream 62 is used to burn the available fuel components in the anode exhaust stream 60, the oxygen content of the spent air 62 is less than 21% by volume. Part of the oxygen content in the cathode inlet stream 44 is used in the electrochemical reaction in the fuel cell assembly 34. As mentioned in the preceding sections, any oxidant stream comprising the required amount of oxygen may be used in a fuel cell. In accordance with the present technique, in some embodiments, the oxygen content in the spent oxidant stream or cathode exhaust stream 62 is less than or equal to 25% by volume. It is very important to control the injection of the amount of this oxygen depleted spent air 64 into the TGB 38 for burning the low heat content anode exhaust stream 60. The presence of nitrogen in the oxygen depleted spent air 64 makes the mixture leaner once the spent air 64 is mixed with the anode exhaust stream 60 in the TGB 38 and combustion of the fuel content in the anode exhaust stream 60 becomes difficult to achieve.

Figure 4:
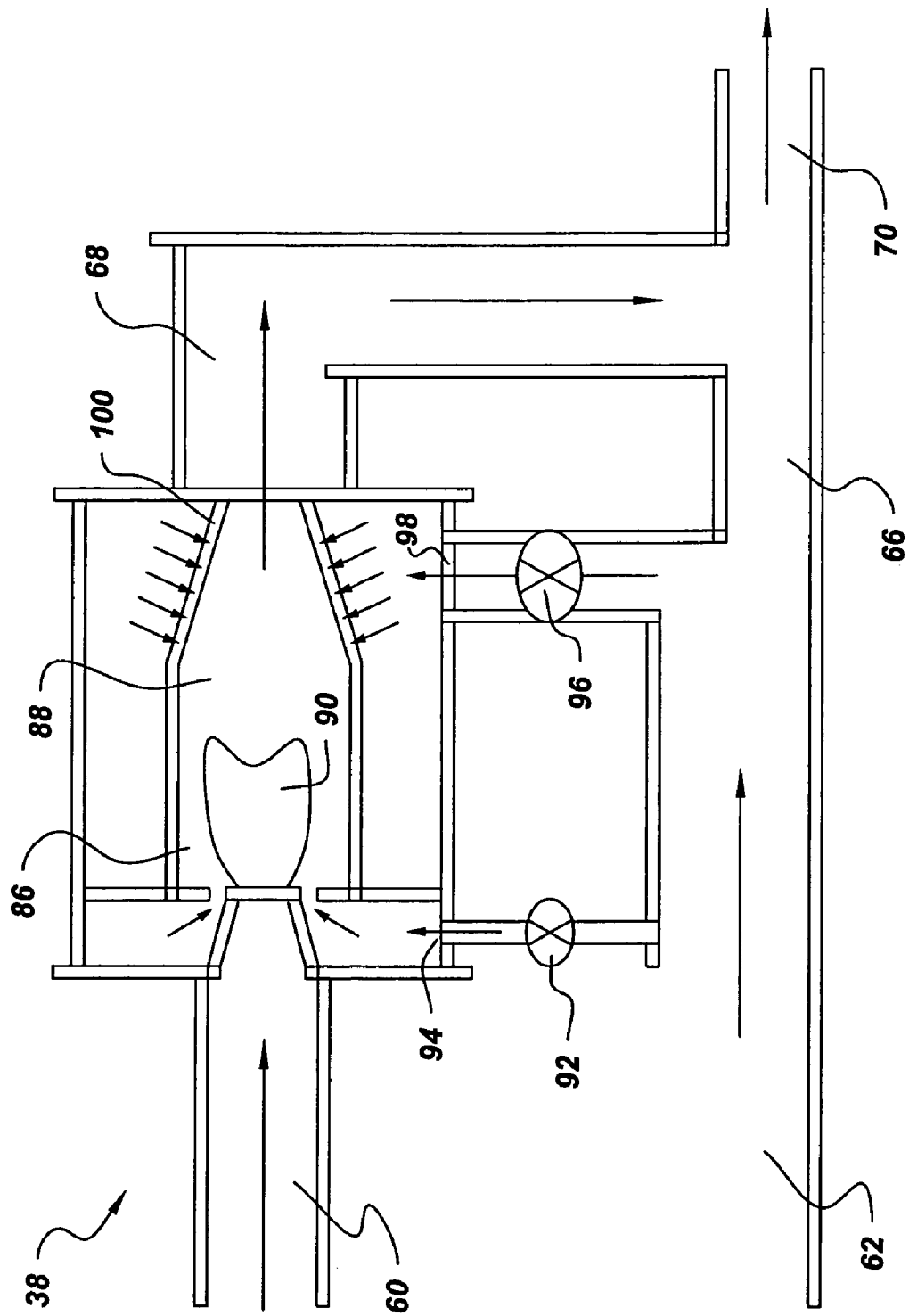
FIG. 4 is a diagrammatical view of an exemplary tail gas burner.

FIG. 4 shows a diagrammatical view of an exemplary embodiment of the TGB 38. The TGB 38 is designed to handle fuel with very low heat content. The TGB 38 is divided into two zones, a primary zone 86 and a secondary zone 88. The primary zone 86 may also be described as the flame stabilization zone. A portion of the oxygen-depleted spent air is injected in both these zones. A portion of the spent air 64 is injected into the primary zone 86 via a control valve 92. The oxygen-depleted spent air enters the primary zone 86 through the air inlet 94. The reason for controlling the air injection in the primary zone 86 is to achieve the stability of the flame 90.

Another portion of the spent air 64 is injected in a controlled fashion into the secondary zone 88 via a control valve 96 and the oxygen-depleted spent air enters the secondary zone 88 through inlet 98. The secondary zone 88 may also be described as the auxiliary burning zone. The secondary zone 88 is connected to the outlet of the TGB 38 through a transition piece 100. In the secondary zone 88, the controlled air injection is done to achieve maximum combustion of the fuel content in the anode exhaust stream 60 and to avoid carbon monoxide or unburnt fuel emission from the hybrid power plant 10. The anode exhaust stream 60 is typically injected into the TGB 38 through a nozzle (not shown). In some embodiments, the TGB 38 is configured to inject the anode exhaust stream 60 into the TGB 38 through more than one nozzles. Increasing the number of nozzles to inject the incoming fuel in the TGB 38 may be one of the ways to handle an increased fuel flow rate.

Figure 5:
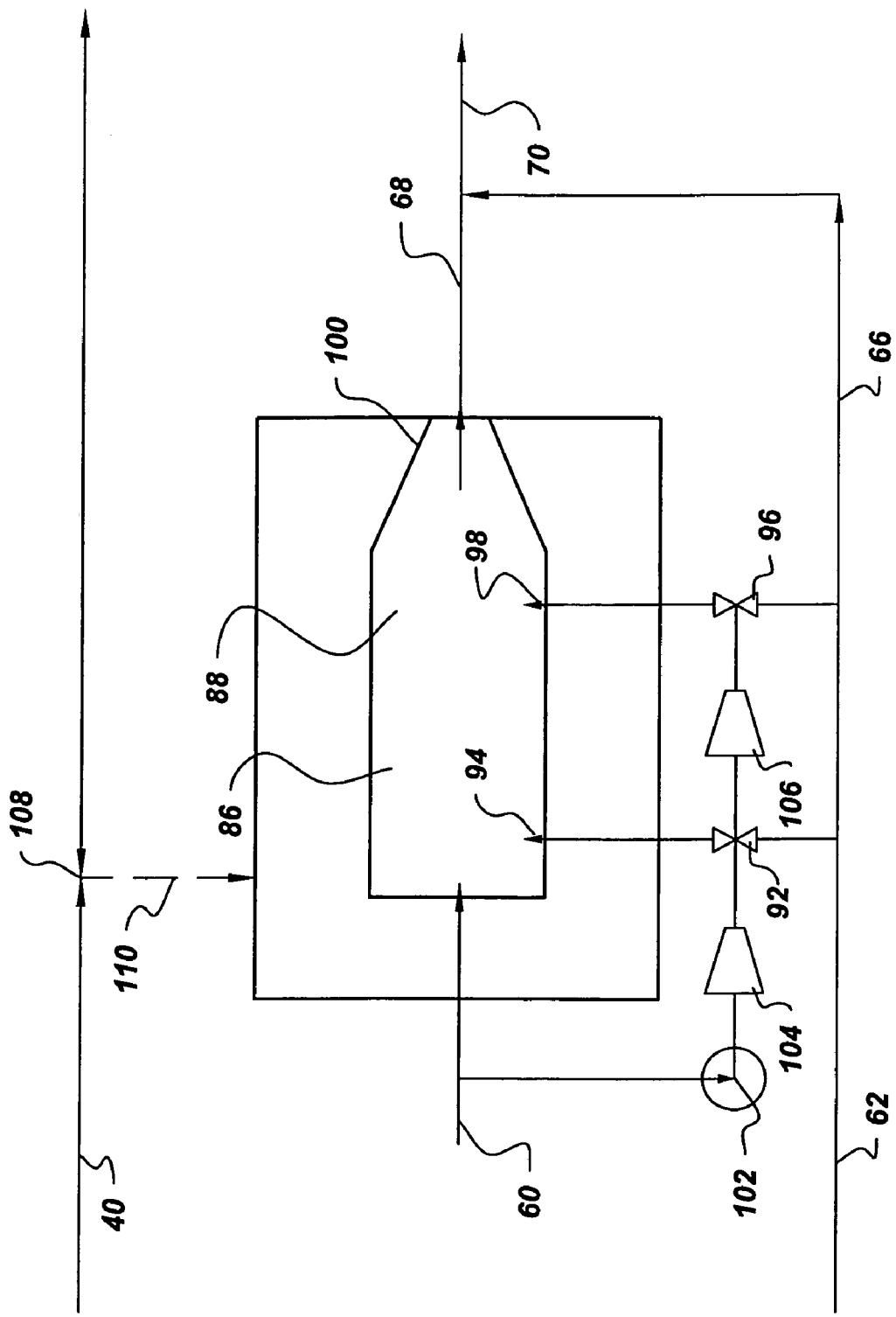
FIG. 5 is a diagrammatical view of an exemplary control scheme of injection of air into the tail gas burner.

The degree and the type of controls needed for the primary zone 86 and secondary zone 88 in the TGB 38 are different and may be achieved through automatic control schemes. FIG. 5 shows an exemplary control scheme of the oxygen depleted spent air injection into the TGB 38. The air injection may be controlled by a passive or an active control or a combination of both. FIG. 5 shows an exemplary scheme for a passive control scheme for the spent air injection into the TGB 38. In this control scheme, the spent air injection to the primary zone 86 is done through a primary control algorithm G(U) and the spent air injection to the secondary zone 88 is achieved through a secondary control algorithm H(V), wherein both (U) and (V) are functions of several process parameters related to the operation and performance of the fuel cell assembly 34. These algorithms, G(U) and H(V), determine the mass of air to be injected into each of the zones to achieve flame stability and reduced emissions.

Since the control algorithms work to achieve different end results in two zones, the functions (U) and (V) may be different although they may depend on the same set of process parameters. The input parameters for the control algorithms are provided by a set of sensors 102. The parameters can also be obtained from other sensors (not shown) available in the fuel cell assembly 34. These parameters include but are not limited to fuel utilization in the fuel cell assembly 34, pressure and temperature of the fuel cell assembly 34, mass flow of fuel, and power generated in the fuel cell assembly. The algorithms G(U) and H(V) could also be dependent on the parameters, such as, oxygen content in the oxygen depleted cathode exhaust stream and residence time of the fuel in the primary and the secondary zone. The parameters are fed into the actuators 104 for primary zone 86 and 106 for secondary zone 88. Accordingly the opening of the control valves 92 and 96 determines the mass of air to be injected into the primary and secondary zones. The mass of air injected into the primary zone 86 may be higher or lower than the corresponding stoichiometric amount of oxygen needed for burning the fuel content of the anode exhaust stream 60. The mass of air injected into the primary zone 86 may be less than about 20% of the total cathode exhaust stream 54. Accordingly the mass of air injected into the secondary zone may vary from about 5% to about 100% of the cathode exhaust stream 54.

The control of the spent air injection into the TGB 38 can also be achieved by active control scheme (not shown), wherein the input parameters are measured downstream of the TGB 38 and a feedback loop is provided, which feedback loop controls the opening and closing of the valves 92 and 96. The performance and the life of the TGB 38 are further enhanced by a cooling arrangement using a portion of the cold compressed air stream 40 available in the hybrid power plant 10. A portion of the compressed air stream 40 may be diverted (as shown in FIG. 5) to the TGB 38 for cooling purpose. In operation, several hot spots may exist in the TGB 38, for example, the nozzles (not shown) through which the spent fuel stream 60 is introduced into the TGB. The cold compressed air may be utilized to cool these hot spots, increasing the life of the burner and simultaneously increasing the thermal efficiency of the entire hybrid plant 10, as the heat taken out from the parts of the TGB 38 will be utilized to further heat up the air stream to the cathode inlet 46. A control valve 108 controls the mass of the cold compressed air 110, diverted for the cooling of the hot spots in the TGB 38.

Coming back to FIG. 1, the hot exhaust 68 from tail gas burner 38 is mixed with the portion of remaining spent air 66 and the mixed stream 70 is fed into the working fluid paths of gas turbine 14. Thermodynamic expansion of the exhaust 70 produces work to drive the turbine 14, which, in turn, generates electricity in generator 18. Electricity from generator 18 and fuel cell assembly 34 are converted to an appropriate form and to a distribution power supply network, illustrated as grid 72 in FIG. 1.

Figure 2:
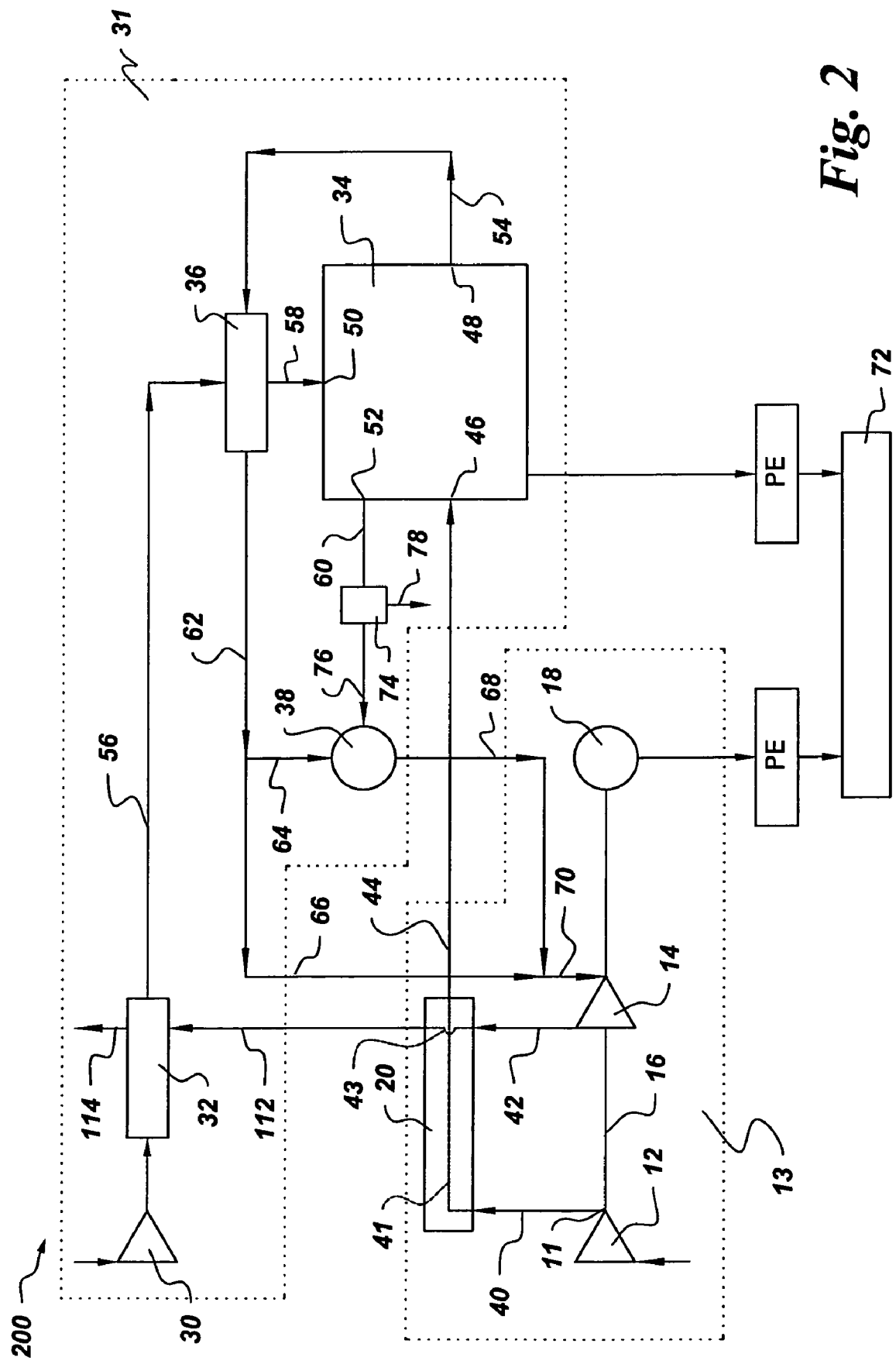
FIG. 2 is a schematic diagram of another exemplary integrated fuel cell hybrid power plant with carbon dioxide separation unit.

FIG. 2 is a schematic diagram of another exemplary embodiment of an integrated fuel cell hybrid power plant 200 sharing the basic components of power plant 10 (shown in FIG. 1), in which like features are designated with like reference characters.

In the gas turbine portion of plant 200, compressor 12 supplies compressed air to a recuperator 20, and compressed air within recuperator 20 is heated by turbine exhaust 42 as described above to produce a heated air stream supply 44 to cathode inlet 46. In the fuel cell assembly 34, the air is reacted with a fuel to generate electricity as described above.

Cathode exhaust stream 54 exhausted from the cathode outlet 48 of the fuel cell assembly 34 is passed to reformer a 36. Gaseous fuel, which in different embodiments may be natural gas, methane, propane, n-heptane, diesel, kerosene, gasoline, or a coal derived fuel gas, is driven by fuel pump 30 through the de-sulferizer 32 as discussed in the preceding sections. In some embodiments, the fuel is an aviation fuel comprising fillers. De-sulferized fuel 56 flows from the de-sulferizer 32 to the reformer 36 so that fuel may be reformed therein prior to entering the fuel cells of the fuel cell assembly 34. Once treated therein, reformed fuel 58 flows from the reformer 36 to the anode inlet 50 and into the fuel cells of assembly 34. Once expanded in the fuel cells, spent fuel 60 (also designated as anode exhaust stream) is exhausted from the fuel cell assembly 34 through anode exhaust 52. The anode exhaust stream 60 is sent to a separation unit 74, where the carbon dioxide in the anode exhaust stream 60 is separated. The separation of carbon dioxide may be achieved using chemical absorbents like calcium oxide. Techniques like pressure swing adsorption (PSA) and membrane separation suitable for high temperature application may also be used for carbon dioxide separation from the anode exhaust stream 60. Once the separation of carbon dioxide is achieved, a carbon dioxide rich stream 78 is generated that may exported to be industrially used elsewhere.

After separation of carbon dioxide, the anode exhaust stream 60 is fed to a tail gas burner 38 for combustion therein. A portion of the spent (i.e., oxygen depleted) air 64 from fuel cell assembly 34 is also fed into tail gas burner 38, and a mixture of spent air 64 and exhausted fuel 76 is combusted in tail gas burner 38. The combustion of the low heat content anode exhaust stream 60 is achieved by controlling the injection of oxygen-depleted spent air 64 as described in the preceding sections.

Combustion exhaust 68 along with the rest of the spent air 66 is fed to the working fluid paths in gas turbine 14 to provide added heat and pressure for expansion of gas in turbine 14. The thermodynamic expansion of the exhaust 70 produces work to drive the turbine 14, which, in turn, generates electricity in generator 18. Electricity from generator 18 and fuel cell assembly 34 are converted to an appropriate form and to a distribution power supply network, illustrated as grid 72.

Figure 3:
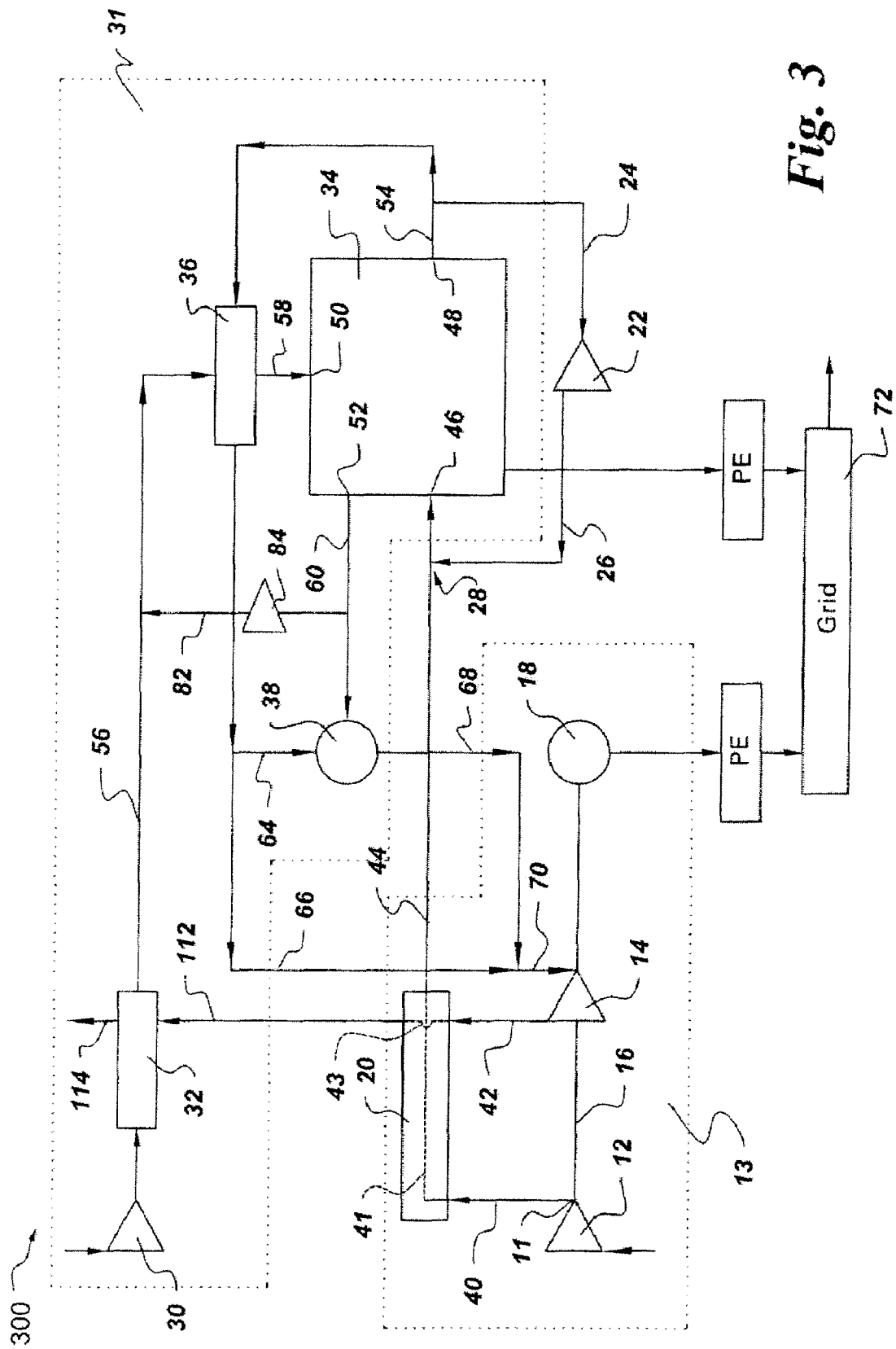
FIG. 3 is a schematic diagram of yet another exemplary integrated fuel cell hybrid power plant with anode exhaust recycle.

FIG. 3 is a schematic diagram of yet another exemplary embodiment of an integrated fuel cell hybrid power plant 300 sharing the basic components of power plant 10 (shown in FIG. 1), in which like features are designated with like reference characters.

In accordance with the present technique as illustrated in FIG. 3, spent air 54 is partly diverted into a negative pressure re-circulation flow path 24 in flow communication with blower 22. Blower 22 forces air therefrom in a positive pressure re-circulation flow path 26 to provide a re-circulated air stream which is fed back to compressed and heated air stream 44 from recuperator 20. The re-circulated air stream in re-circulation flow path 26 is therefore mixed with fresh air stream 44 at a flow path junction 28. Mixing of re-circulated spent air 24 exhausted from the fuel cell assembly 34 with fresh air 44 through re-circulation flow path 26 is advantageous in several respects.

For example, re-circulation of hot exhaust air 26 from fuel cell assembly 34 and mixing it with fresh air from compressor air 44 raises an air temperature at cathode inlet 46 by a direct mass and heat transfer process. A need for diffusive heat transfer provided by a heat exchanger in conventional systems is therefore eliminated. Coupled with turbine exhaust flow 42 in recuperator 20 to heat compressed air 40, a considerably lower cost and less complex heat exchanger, such as recuperator 20, may be employed.

Additionally, re-circulated air 24 from fuel cell assembly exhaust 54 via flow path 26 increases an air mass flow rate to fuel cell assembly 34 at cathode inlet 46 and facilitates a substantially constant total system air flow rate for increased system performance. The increased air mass flow to the fuel cell assembly 34 at cathode inlet 46 produces greater temperature uniformity within the fuel cell assembly 34 and further enhances performance of fuel cell assembly 34. As such, higher fuel flow rates are possible for a given constant range of assembly temperatures. Higher fuel flow rates at substantially constant total system air flow reduces the amount of total excess air, and thereby raises the firing temperature of turbine 14 enhancing overall system performance.

Still further, with sufficient amounts of re-circulated air 26 mixing with fresh air supply 44 through flow path 26, a limit of a stoichiometric operation of the fuel cell assembly may be approached relative to the incoming fresh air.

Even further, re-circulated airflow path 26 effectively reduces cathode concentration of oxygen ($O_2$) in fuel cell assembly 34, which is known to be a key degradation mechanism in hot fuel cells. It is therefore believed that re-circulated airflow path 26 provides enhanced performance and longer life of the hot fuel cell assembly.

As shown in FIG. 3, a portion of the spent fuel 60 is diverted into a re-circulation fuel stream flow path 82 that mixes with fresh de-sulferized fuel 56. Re-circulation of hot exhausted fuel via re-circulation flow path 82 further avoids external fuel heaters and re-introduces unspent fuel into fuel cell assembly 34, thereby increasing fuel efficiency in the system. Re-circulation of exhausted fuel could be accomplished, for example, with a blower, an ejector pump 84, or the like as those in the art will appreciate. In a further or alternative embodiment, steam (not shown) may be introduced to the fuel stream 56 prior to reforming to facilitate reforming.

For at least the reasons set forth above, power plants 10, 200 and 300 provide better overall plant performance in relation to known systems while providing thermal efficiency and improved temperature control of the fuel cell assembly through re-circulation flow paths and while avoiding complexity and costs of conventional heat exchangers to maintain the fuel cell assembly at desired temperatures. The controlled injection of the oxygen depleted spent air 64 in the tail gas burner 38 enhances the performance of the hybrid power plants in all the embodiments described above. In hybrid power plant 300, re-circulation of fuel cell assembly cathode exhaust also facilitates inlet air temperature control to the fuel cell assembly, which, in turn, provides for more precise control of temperature rise and uniformity within the fuel cell assembly. Re-circulation of fuel cell assembly cathode exhaust provides increased turbine section inlet temperature to provide more work in the turbine, provides for increased performance retention via reduced cathode side oxidation, permits fuel cell assembly operation at stoichiometric conditions, and simplifies exhaust after-treatment before discharging plant exhaust to the atmosphere.

While the invention has been described in terms of various specific embodiments, those skilled in the art will recognize that the invention can be practiced with modification within the spirit and scope of the claims.

The invention claimed is:

1. A hybrid power generation system for generating electrical power comprising:
   a compressor for producing a compressed oxidant;
   a recuperator in flow communication with said compressor;
   a fuel cell assembly comprising a plurality of fuel cells in flow communication with said recuperator to provide the compressed oxidant for said fuel cell assembly, said fuel cell assembly further comprising a cathode inlet for receiving the compressed oxidant, an anode inlet for receiving a fuel stream, an anode outlet in flow communication with an anode exhaust stream and a cathode outlet in flow communication with a cathode exhaust stream; wherein at least a portion of the fuel stream reacts with the oxidant to produce electrical power;

a tail gas burner in fluid communication with the anode outlet and the cathode outlet; said tail gas burner configured for combusting a mixture of at least a portion of the anode exhaust stream and at least a portion of the cathode exhaust stream and producing a hot compressed gas, wherein the tail gas burner comprises a primary zone and a secondary zone;

a control system for controlling the amount of the cathode exhaust stream introduced in the tail gas burner for stable combustion and reduction of fuel and carbon monoxide emission, wherein less than 20 percent of the cathode exhaust stream by mass is diverted to the primary zone of the tail gas burner and about 5 percent to about 100 percent of the cathode exhaust stream by mass is diverted to the secondary zone of the tail gas burner; and a turbine expanding said hot compressed gas and producing electrical power and an expanded gas.

2. The hybrid power generation system of claim 1, wherein the anode exhaust stream comprises a low heat content fuel configured to have a heat content.

3. The hybrid power generation system of claim 2, wherein the heat content of the low heat content fuel is equal or less than about 250 BTU per cubic feet at standard conditions.

4. The hybrid power generation system of claim 2, wherein the heat content of the low heat content fuel is equal or less than about 100 BTU per cubic feet at standard conditions.

5. The hybrid power generation system of claim 1, wherein the cathode exhaust stream comprises oxygen in less than about 25 percent by volume.

6. The hybrid power generation system of claim 1, wherein the oxidant is air.

7. The hybrid power generation system of claim 6, wherein the cathode exhaust stream is an oxygen depleted air stream comprising oxygen in less than about 21 percent by volume.

8. The hybrid power generation system of claim 1, wherein at least one portion of the compressed oxidant is diverted to the tail gas burner to provide cooling for the tail gas burner.

9. The hybrid power generation system of claim 1, wherein the anode exhaust stream is introduced into the tail gas burner through one or more nozzles.

10. The hybrid power generation system of claim 1, wherein the fuel cell is selected from the group consisting of solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

11. The hybrid power generation system of claim 1, further comprising a pre-reformer to reform the fuel stream.

12. The hybrid power generation system of claim 1, wherein at least a portion of the anode exhaust stream is recycled to the inlet of the pre-reformer.

13. The hybrid power generation system of claim 12, wherein the pre-reformer is an integral part of the fuel cell assembly.

14. The hybrid power generation system of claim 1, wherein at least a portion of the cathode exhaust stream is recycled back to the cathode inlet of the fuel cell assembly.

15. The hybrid power generation system of claim 1, wherein the anode exhaust stream comprises carbon monoxide, unreacted fuel, carbon dioxide and water.

16. The hybrid power generation system of claim 15, further comprising a separation unit to separate the carbon dioxide from the anode exhaust stream.

17. The hybrid power generation system of claim 1 wherein the fuel is selected from the group consisting of natural gas, methane, aviation fuels, propane, n-heptane, diesel, kerosene, gasoline, and coal derived fuel gas.

18. A hybrid power generation system for generating electrical power comprising:

a compressor for producing compressed air;

a recuperator in flow communication with said compressor;

a solid oxide fuel cell assembly comprising a plurality of solid oxide fuel cells in flow communication with said recuperator to provide the compressed air for said solid oxide fuel cell assembly, said fuel cell assembly further comprising a cathode inlet for receiving the compressed air, an anode inlet for receiving a fuel stream, an anode outlet in flow communication with an anode exhaust stream and a cathode outlet in flow communication with a cathode exhaust stream; wherein at least a portion of the fuel stream reacts with the air to produce electrical power;

a tail gas burner in fluid communication with the anode outlet and the cathode outlet; said tail gas burner configured for combusting a mixture of at least a portion of the anode exhaust stream and at least a portion of the cathode exhaust stream and producing a hot compressed gas, wherein the tail gas burner comprises a primary zone and a secondary zone;

a control system for controlling the amount of the cathode exhaust stream introduced in the tail gas burner for stable combustion and reduction of fuel and carbon monoxide emission, wherein less than 20 percent of the cathode exhaust stream by mass is diverted to the primary zone of the tail gas burner and about 5 percent to about 100 percent of the cathode exhaust stream by mass is diverted to the secondary zone of the tail gas burner; and a turbine for expanding said hot compressed gas and producing electrical power and an expanded gas.

* * * * *

UNITED STATES PATENT AND TRADEMARK OFFICE
CERTIFICATE OF CORRECTION

PATENT NO. : 7,595,124 B2  Page 1 of 1
APPLICATION NO. : 10/681704
DATED : September 29, 2009
INVENTOR(S) : Varatharajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Twenty-eighth Day of September, 2010

David J. Kappos
*Director of the United States Patent and Trademark Office*